United States Patent
Jäger et al.

(10) Patent No.: US 9,033,139 B2
(45) Date of Patent: May 19, 2015

(54) ROD BELT FOR A ROD BELT CONVEYOR FOR AGRICULTURAL MACHINERY

(71) Applicant: Arnold Jäger Holding GmbH, Hannover (DE)

(72) Inventors: Sebastian Jäger, Hannover (DE); Jan-Harm Mulder, Dalen (NL)

(73) Assignee: Arnold Jäger Holding GmbH, Hanover (DE)

( * ) Notice: Subject to any disclaimer, the term of this patent is extended or adjusted under 35 U.S.C. 154(b) by 0 days.

(21) Appl. No.: 13/916,277

(22) Filed: Jun. 12, 2013

(65) Prior Publication Data
US 2014/0367230 A1   Dec. 18, 2014

(51) Int. Cl.
| | |
|---|---|
| *B65G 17/06* | (2006.01) |
| *B65G 15/52* | (2006.01) |
| *B65G 17/42* | (2006.01) |
| *A01D 17/10* | (2006.01) |
| *B65G 15/48* | (2006.01) |

(52) U.S. Cl.
CPC .............. *B65G 17/063* (2013.01); *B65G 17/42* (2013.01); *A01D 17/10* (2013.01); *B65G 15/52* (2013.01); *B65G 15/48* (2013.01)

(58) Field of Classification Search
CPC ...... B65G 15/52; B65G 17/063; B65G 15/42; B65G 15/44; B65G 2812/02683
USPC .................. 198/817, 848, 849, 850
See application file for complete search history.

(56) References Cited

U.S. PATENT DOCUMENTS

| | | | | |
|---|---|---|---|---|
| 2,906,395 | A * | 9/1959 | Greer ............................. | 198/850 |
| 3,976,192 | A * | 8/1976 | Muller .......................... | 198/835 |
| 3,985,224 | A * | 10/1976 | Harvey ......................... | 198/851 |
| 4,023,671 | A * | 5/1977 | Kramer ......................... | 198/728 |
| 4,653,632 | A * | 3/1987 | Timmer et al. ........... | 198/867.14 |

(Continued)

FOREIGN PATENT DOCUMENTS

| | | |
|---|---|---|
| DE | 0861071 | 12/1952 |
| DE | 2715108 | 12/1978 |

(Continued)

OTHER PUBLICATIONS

U.S. Appl. No. 13/916,224, filed Jun. 2013, Mulder.

(Continued)

*Primary Examiner* — Leslie A Nicholson, III
*Assistant Examiner* — Keith R Campbell
(74) *Attorney, Agent, or Firm* — Shlesinger, Arkwright & Garvey LLP (57) ABSTRACT

Rod belt for rod belt conveyors for agricultural machinery, having rods arranged transversely with respect to the running direction and parallel to one another. Rods at their ends are each connected to a fastening piece which has a flattened and perforated support area with which fastening piece rests on tensile stress-resistant, elastic, continuous belts extending in parallel and is connected by rivets or similar fastening elements which pass through support area and belts, and support area is formed in one piece with a fastening area for rod ends. The rod belt includes fastening pieces which have a simple design and are cost-effectively manufactured. Fastening pieces are designed as bends having a fastening area which, in relation to the installed position, is bent from the plane of support area toward the bottom side of belt and situated parallel to the inner side of belt.

10 Claims, 7 Drawing Sheets

(56) References Cited

U.S. PATENT DOCUMENTS

| | | | |
|---|---|---|---|
| 4,724,909 A * | 2/1988 | Link | 171/126 |
| 5,099,548 A | 3/1992 | Loosli | 24/38 |
| 5,168,981 A * | 12/1992 | Ruff | 198/850 |
| 5,176,248 A | 1/1993 | Allen et al. | 198/850 |
| 5,671,839 A * | 9/1997 | Sanderson | 198/848 |
| 5,692,598 A | 12/1997 | Röhrs | |
| 5,738,223 A | 4/1998 | Rohrs | 209/307 |
| 6,106,391 A * | 8/2000 | Tjabringa | 460/144 |
| 6,896,125 B2 * | 5/2005 | Webster et al. | 198/844.2 |
| 7,182,202 B2 | 2/2007 | Kalverkamp | 198/844.1 |
| 7,308,786 B2 * | 12/2007 | Mulder | 56/16.4 R |
| 2005/0109000 A1 | 5/2005 | Mulder | |
| 2008/0202405 A1 | 8/2008 | Kern | |

FOREIGN PATENT DOCUMENTS

| | | | |
|---|---|---|---|
| DE | 34 41 605 A1 | 5/1986 | |
| DE | 3737066 | 8/1989 | |
| DE | 37337 C2 | 7/1992 | B65G 15/52 |
| DE | 195 20 925 A1 | 12/1996 | |
| DE | 195 20 927 A1 | 12/1996 | |
| DE | 200 11 436 U1 | 11/2000 | |
| DE | 10308823 | 9/2004 | |
| DE | 202007015687 | 2/2008 | |
| DE | 10 2007 049 839 | 6/2009 | |
| EP | 0080238 | 6/1983 | |
| WO | 9523497 | 8/1995 | |

OTHER PUBLICATIONS

EPO Office Action, dated Oct. 27, 2014, in counterpart European Application No. 14 17 1472 filed Jun. 6, 2014, which claimed the priority of U.S. Appl. No. 13/916,277, filed Jun. 12, 2013 (7 pages).

EPO Office Action, dated Nov. 7, 2014 in counterpart European Application No. 14 17 1465, filed Jun. 6, 2014, which claims the priority of U.S. Appl. No. 13/916,224, filed Jun. 12, 2013.

* cited by examiner

ROD BELT FOR A ROD BELT CONVEYOR FOR AGRICULTURAL MACHINERY

FIELD OF THE INVENTION

The present invention relates to a rod belt for rod belt conveyors for agricultural machinery.

BACKGROUND OF THE INVENTION

Conventional rod belts for rod belt conveyors for agricultural machinery have a design as disclosed in DE 195 20 927 A1. These types of rod belts have two or more tensile stress-resistant, elastic, continuous belts extending in parallel which are connected to one another by a plurality of parallel rods arranged transversely with respect to the running direction of the rod belt. For fixing the rods to the belts, the rods have flattened, perforated support areas with which they rest on the belts. The support areas are connected to the belts by rivets or similar fastening means which pass through the support area and the belts.

The support areas are produced by forging, by beating round bars flat at their ends. This is carried out at temperatures of 800° to 900° C., and thus requires a high level of energy input. In addition, the purchase of forging presses requires a large capital expenditure. After the forging, the end of the rod must also be quenched and tempered again in order to restore the original material properties of the round rod, in particular the high wear resistance. Furthermore, the forging of the rod ends is subject to large process-related tolerances, which adversely affects the belt precision.

A rod belt of the generic kind is described in DE 200 11 436 U1. In this rod belt, the rods at their ends are not directly connected to the belts, but instead are each connected via a fastening piece. The fastening pieces are produced by forging from a solid rod. The fastening pieces have a flattened, perforated support area which merges into a fastening area for the rod ends via a bend. The fastening area is formed by a cylindrical sleeve extending in the longitudinal direction of the rods, or by a corresponding blind hole. The rods are made of plastic, and are fixed in the sleeves by jamming. The fastening pieces lie with their support areas on the top side of the belts, and are fastened to the belts by rivets.

OBJECTS AND SUMMARY OF THE INVENTION

The object of the present invention is to provide a rod belt of the generic kind in which the fastening pieces have a very simple design and are therefore also manufacturable in an easy and cost-effective manner.

This object is achieved according to the invention with a rod belt which has the features of claim 1.

According to the invention, the fastening pieces are designed as simple bends. In the installed position, the fastening area of the bends is bent toward the bottom side of the belt. It is thus easily possible to connect the rods to the fastening areas in such a way that the longitudinal axes of the rods are situated in the plane of the neutral fiber of the belts, thus reducing the stress on the belts from torques and forces acting on the rods. In addition, the design of the fastening pieces as bends allows the fastening area in the installed position to be advantageously situated at a small lateral distance from the inner side of the belt. As a result, the usable width of the rods, which is situated in the plane of the neutral fibers of the belts, is greater than for rod ends or fastening pieces bent by forging. The rods are straight over their entire length, so that they may be automatically produced using simple machines.

In one advantageous embodiment of the invention, the fastening pieces are produced as stamped-bent parts or cast parts. These may be produced automatically with very high precision. When fastening pieces produced in this way are used, the belt precision is five to ten times higher than for forged rod ends or fastening pieces.

In another advantageous embodiment of the present invention, the fastening area of the fastening pieces is designed as a strip which extends in the direction of the length of the belt, and which has at least two fastening points for rod ends at a distance from a provided rod division. As a result of this approach, the rod division may be reduced, with the division of the fastening points of the fastening pieces on the belts remaining the same. This has advantages in particular for belts that are provided with cams for positive drive of the rod belts, since the division of the rods may be smaller than the division of the cams.

Further advantageous embodiments of the invention result from the other subclaims.

The invention is explained in greater detail below with reference to embodiments. The associated drawings show the following:

DETAILED DESCRIPTION OF THE INVENTION

The rod belt 1 illustrated in the drawings is composed of two parallel revolving belts 2. Only one side of the rod belt 1 is illustrated in the drawings. The other side has a mirror-image design, so that the following statements also apply to this side.

The belts in the present embodiment are designed as cam belts, and may be made, for example, of rubber reinforced by fabric inserts 2.1.

Cams 3 which are spaced apart from one another in a division x are provided on the bottom side of the belts 2. These cams 3 are used for the positive drive of the rod belt 1. For this purpose, a drive means, not illustrated, of drive wheels engages with gaps 4 between the cams 3. These types of designs are known from the prior art, and therefore do not have to be explained in greater detail.

The spacing between the belts 2 is provided by rods 5 arranged transversely with respect to the conveying direction of the rod belt 1 and parallel to one another, and with their ends connected to the belts 2.

Figure 3:
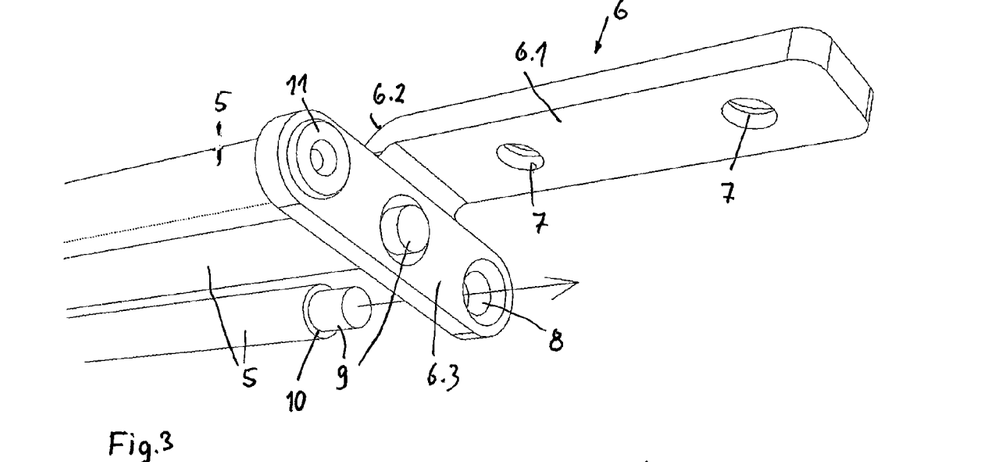
FIG. 3 shows a first installation step in the production of a rod belt according to the first embodiment of the invention.

The fastening pieces 6 have the simple shape of a bend, and are produced as high-precision, wear-resistant, hardened stamped-bent parts. The fastening pieces have a support area 6.1 which has fastening holes 7 spaced apart at a distance from one another. This support area 6.1 merges, in a 90° convex curvature 6.2, into a strip 6.3 which extends transversely with respect to the support area 6.1 and situated perpendicular thereto. The strip 6.3 has three holes 8, which in their longitudinal extension are spaced apart from one another in a division y. The holes 8 are used for fastening the rods 5 to the fastening pieces 6. For this purpose, the rods 5 are provided at their ends with a central journal 9 (FIG. 3), which may be produced by lathe turning. A shoulder 10 is present between the journal 9 and the remainder of the rod body. For establishing the connection between the rods 5 and the fastening pieces 6, the journals 9 are inserted through the holes 8 in the strip 6.3, and then fixed to the strip 6.3 in a rotationally fixed manner by producing a riveted joint 11. Since the shoulder 10 of the riveted joint 11 lies against the strip 6.3, the rods 5 are also axially fixed to the fastening pieces 6. The production of the riveted joint 11 between the rods 5 and the fastening piece 6 is illustrated in consecutive stages in FIG. 3.

Figure 4:
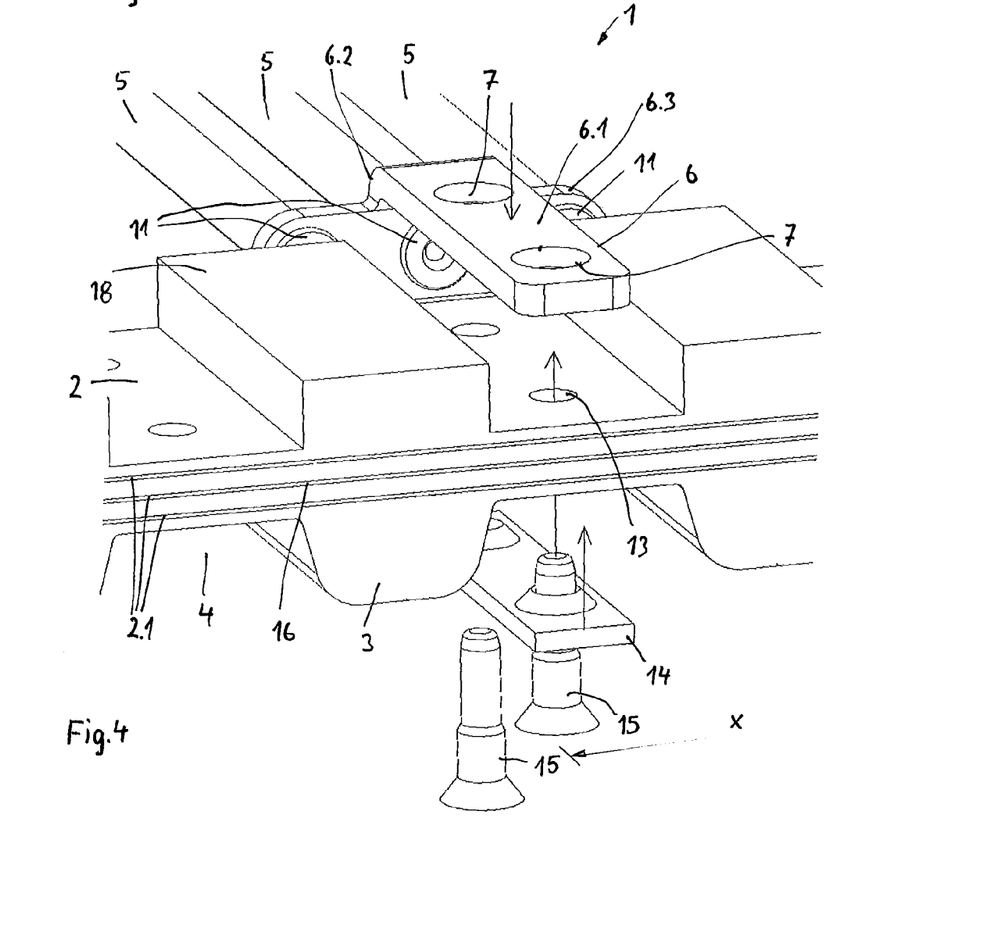
FIG. 4 shows a second installation step in the production of a rod belt according to the first embodiment of the invention.

After the rods 5 have been connected to the fastening pieces 6 as described above, the fastening pieces are placed with the bottom side of their support areas 6.1 on the belts 2 so that the holes 7 in the support area 6.1 are aligned with holes 13 provided in the belts 2. Rivets 15 are subsequently inserted through the holes 13 and 7 from below, with connection of a rivet plate 14 in between, and a riveted joint is produced between the fastening pieces 6 and the belts 2, as illustrated in FIG. 4.

Figure 1:
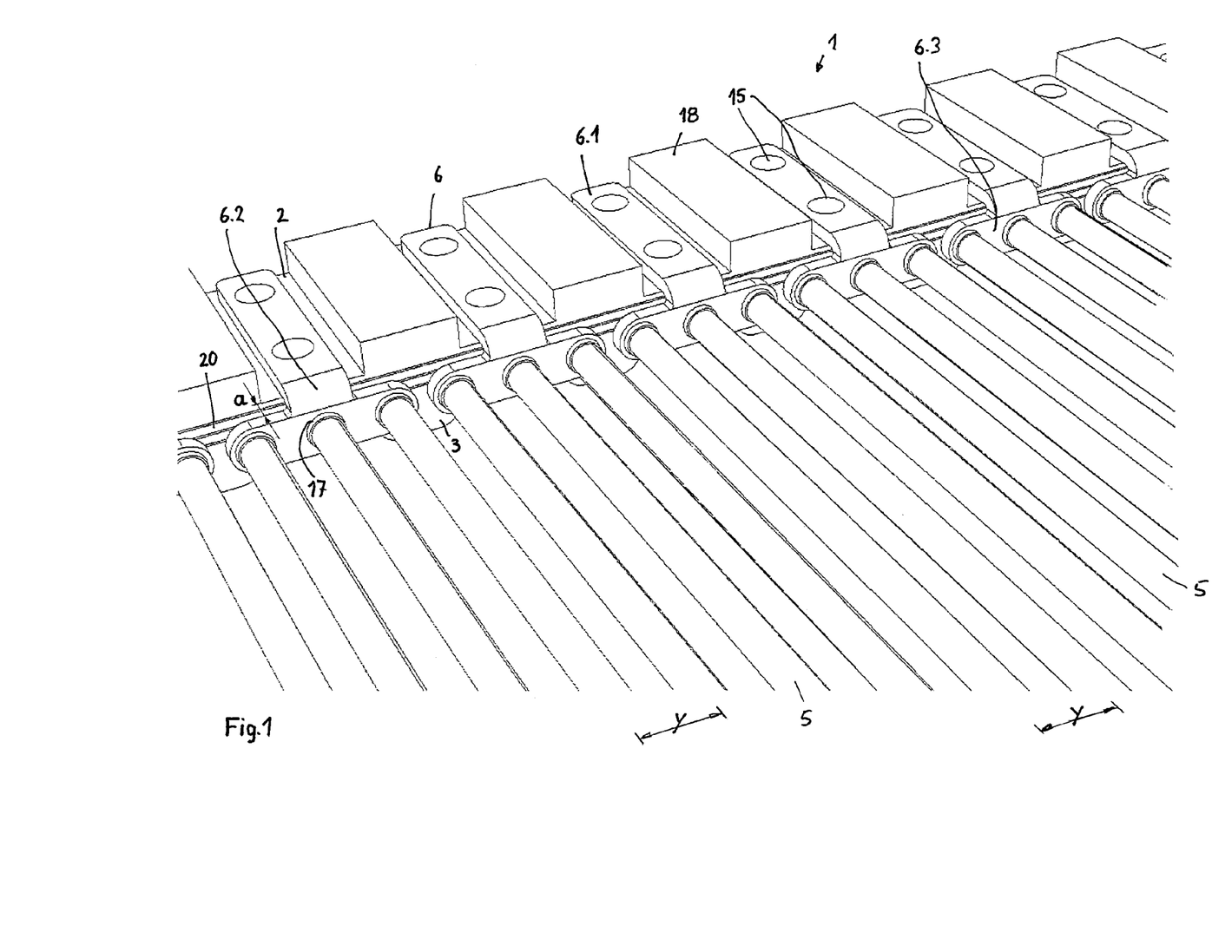
FIG. 1 shows a perspective view, obliquely from above, of a side area of a rod belt according to a first embodiment of the invention.
Figure 2:
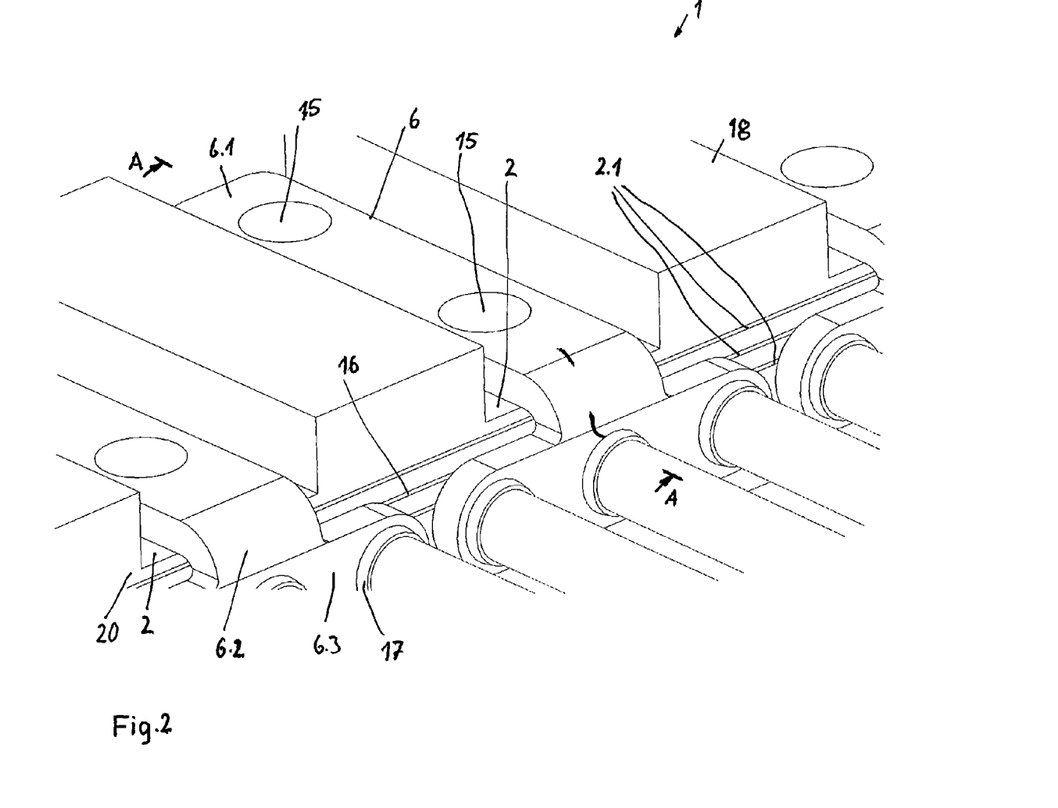
FIG. 2 shows an enlarged detail of the illustration according to FIG. 1.

In the installed position of the fastening piece 6, the strip 6.3 thereof extends at a small lateral distance a (FIG. 1) from the inner side 20 of the belt and parallel thereto. The longitudinal axes 21 of the rods 5 lie in the plane of the neutral fibers 16 of the belts 2. The lateral distance a is 0.1 to 10 mm.

Figure 10:
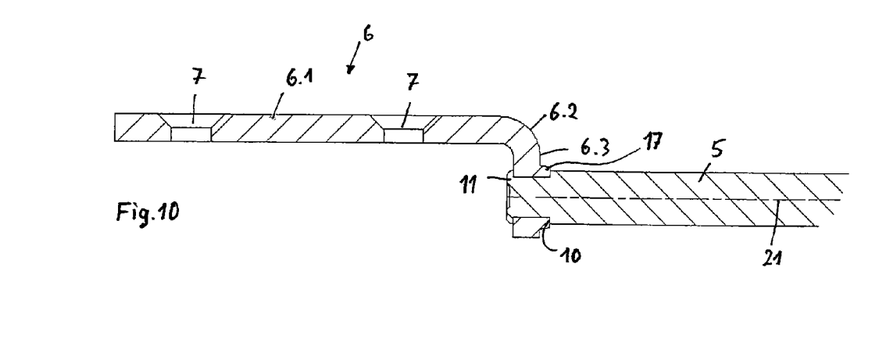
FIG. 10 shows a section A-A according to FIG. 2.

FIG. 10 shows a section of a connecting point between the rods 5 and the fastening pieces 6. It is readily apparent from this illustration that the strip 6.3 of the fastening piece 6 is axially encapsulated between the riveted joint 11 and the shoulder 10. It is further apparent from this illustration that the holes 8 in the strip 6.3 are provided with a passage 17, thus stabilizing the connection between the rods 5 and the fastening pieces 6.

Since the support areas 6.1 of the fastening pieces 6, viewed in the running direction of the belts 2, have only a narrow extension, further cams 18 may be provided on the top side of the belts 2, diametrically opposite from the cams 3. These cams 18 are used for protecting the support areas 6.1 of the fastening pieces 6 which are fastened to the belts.

Figure 5:
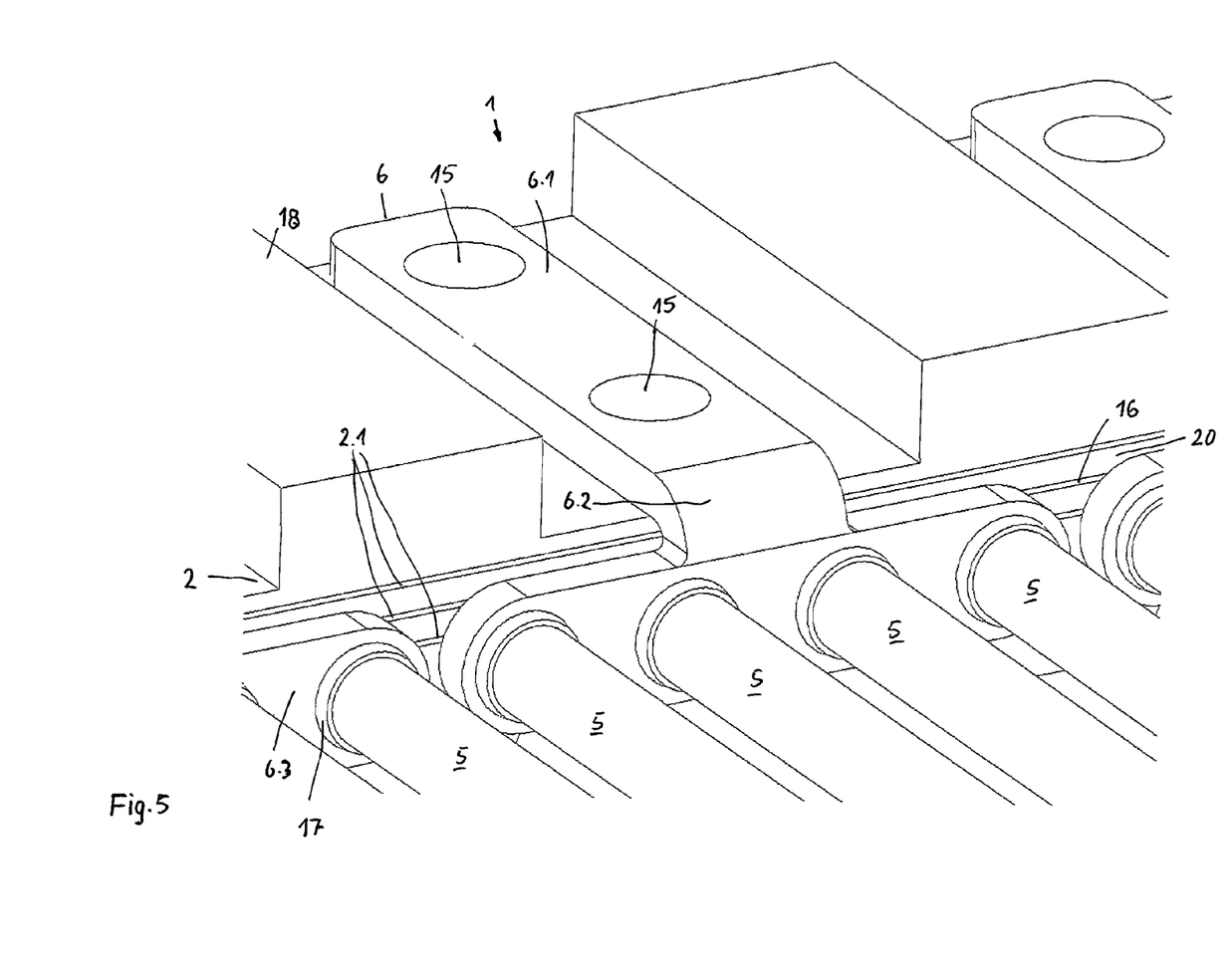
FIG. 5 shows an illustration corresponding to FIG. 2 of a second embodiment of the invention.
Figure 6:
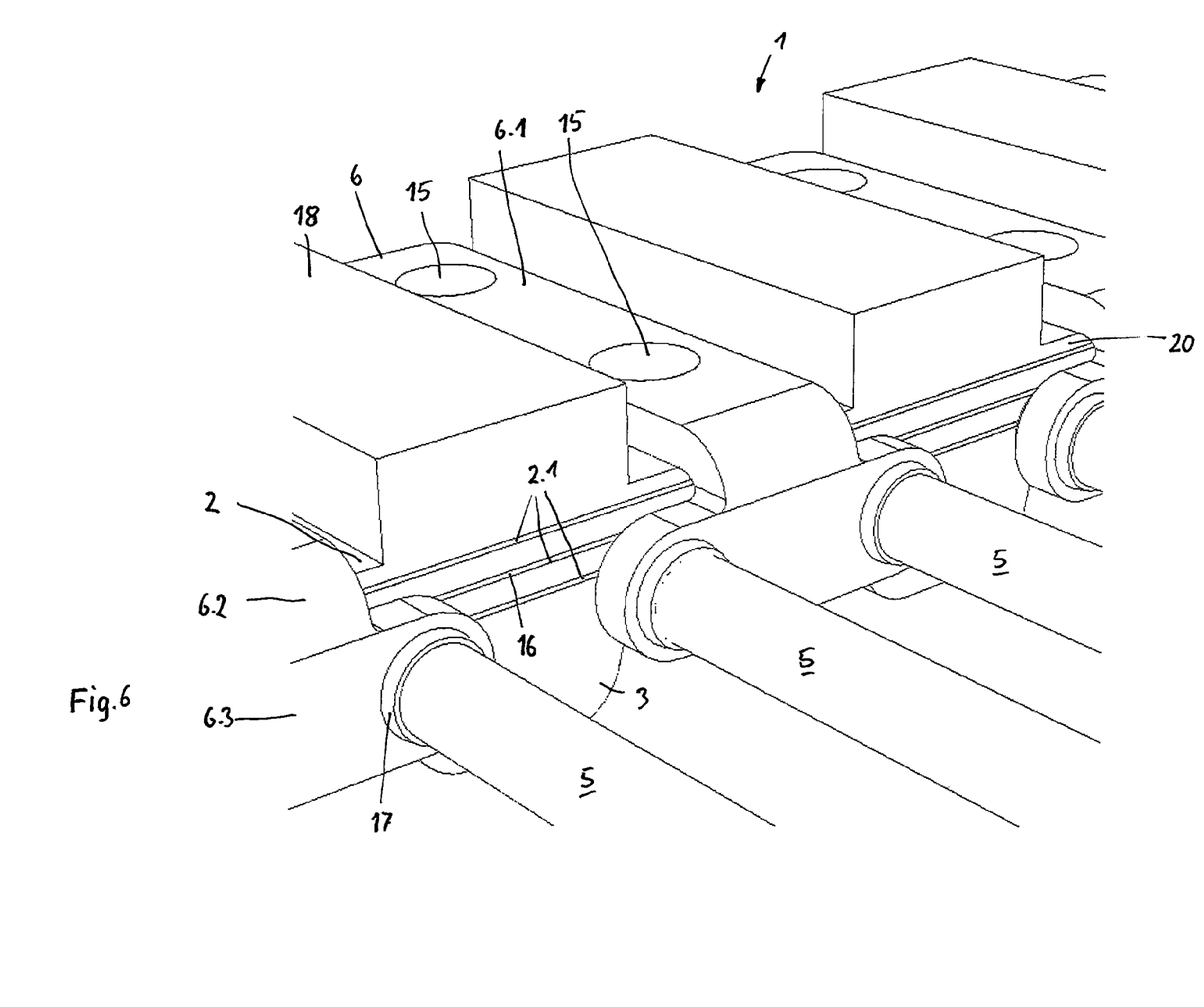
FIG. 6 shows an illustration corresponding to FIG. 2 according to a third embodiment of the invention.

The embodiments according to FIGS. 5 and 6 differ from the above embodiment solely in that in each case four rods 5 (FIG. 5) or two rods 5 (FIG. 6) are fastened to the strip 6.3 of the fastening piece 6.

Figure 7:
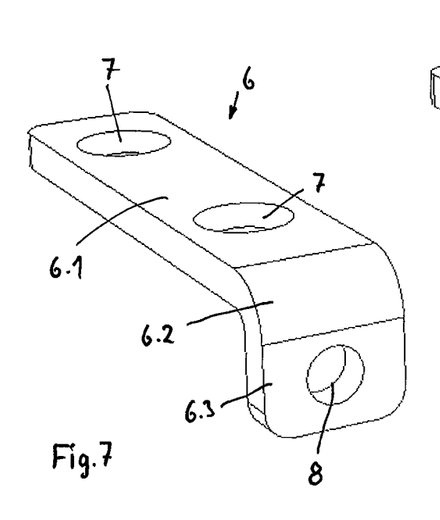
FIG. 7 shows a perspective illustration of a fastening piece according to a fourth embodiment of the invention.

FIG. 7 shows another embodiment of a fastening piece 6. This fastening piece 6 is provided for fastening only one rod 5. For this purpose a hole 8, which, however, in this case has no passage, is provided in the strip 6.3.

Figure 8:
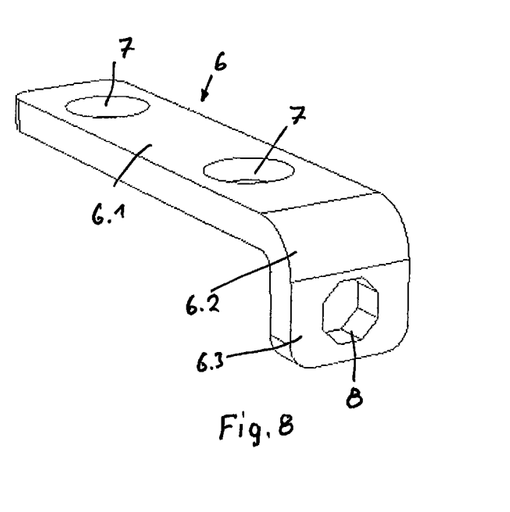
FIG. 8 shows a fastening piece according to FIG. 7 with a modified fastening hole.

FIG. 8 likewise shows a fastening piece 6 for fastening a rod 5. The only difference from the fastening piece 6 according to FIG. 7 is that the hole 8 is noncircular, thus providing additional protection against twisting of the rod 5 in the hole 8.

Figure 9:
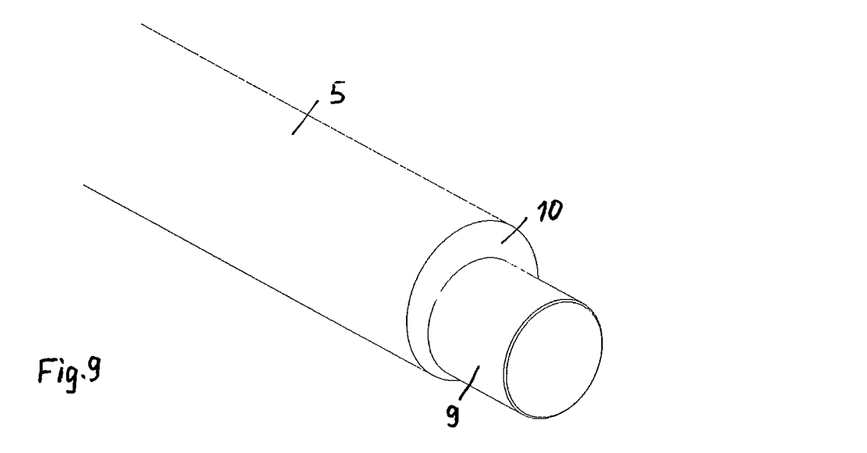
FIG. 9 shows a rod end according to another embodiment of the present invention.

FIG. 9 shows a rod end having an eccentric journal 9. Due to the eccentricity of the journal 9 with respect to the rod axis 21, the position of the rod 5 in the hole 8 in the fastening piece 6 may be changed by twisting prior to the final fastening by riveting or welding, for example.

Figure 11:
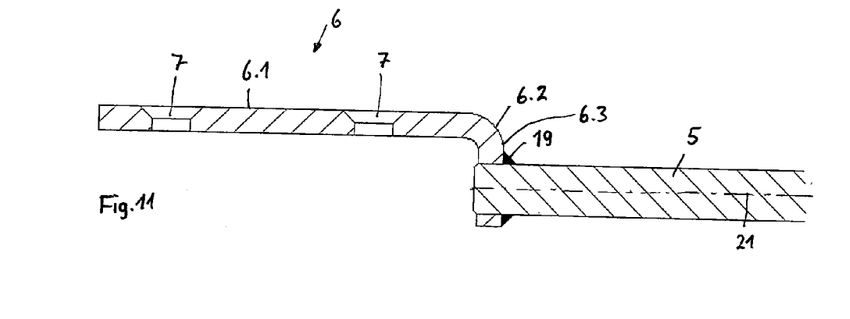
FIG. 11 shows an illustration corresponding to FIG. 10 in a second embodiment.
Figure 12:
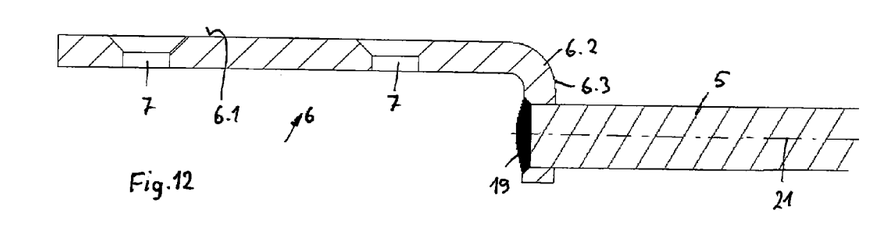
FIG. 12 shows an illustration corresponding to FIG. 10 in a third embodiment.

FIGS. 11 and 12 show embodiments in which the connection between the rods 5 and the fastening pieces 6 is established by welds 19.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. Rod belt for rod belt conveyors for agricultural machinery, the rod belt having a running direction and including a top side, a bottom side, a plane of neutral fibers between the top and bottom sides, and an inner side, the rod belt comprising:
   a) rods which are straight over their entire length, have respective longitudinal axes, and are arranged transversely with respect to the running direction and parallel to one another, and which at their ends are each connected to a respective one-piece fastening piece which has a flattened and perforated support area with which the fastening piece rests on tensile stress-resistant, elastic, continuous belts extending in parallel and is connected by rivets which pass through the support area and the belts;
   b) the support area defines a plane and is formed in one piece with a fastening area for the rod ends;
   c) the respective fastening pieces are designed as bends having the fastening area which, in relation to the installed position, is bent from the plane of the support area toward the bottom side of the belt and is situated parallel to the inner side of the belt, and the fastening pieces being produced as one-piece stamped-bent parts or cast parts;
   d) the fastening area is flat and is designed as a strip which is situated parallel to the inner side of the belt and which has at least two fastening points for the rod ends at a distance from a provided rod division; and
   e) the rods being connected to the fastening areas so that the longitudinal axes of the rods are situated in the plane of the neutral fiber of the rod belt, thus reducing the stress on the belts from torques and forces acting on the rods.

2. Rod belt according to claim 1, wherein:
   a) in the installed position, the fastening area has a small lateral distance from the inner side of the belt for increasing the usable width of the rods.

3. Rod belt according to claim 1, wherein:
   a) the fastening area has a hole for accommodating a rod end, the rod end being fixed in the hole in a rotationally fixed and axially nondisplaceable manner.

4. Rod belt according to claim 3, wherein:
   a) the hole is provided with a passage.

5. Rod belt according to claim 1, wherein:
   a) the fastening points are holes for accommodating the rod ends, the rod ends being fixed in the holes in a rotationally fixed and axially nondisplaceable manner.

6. Rod belt according to claim 5, wherein:
a) the holes are provided with a passage.

7. Rod belt according to claim 1, wherein:
a) the belts are provided with cams for a positive drive, and a division of the cams is greater than a division of the rods.

8. Rod belt according to claim 3, wherein:
a) the rod ends are designed as journals whose cross section is adapted to the cross section of the holes in the fastening area, and is smaller than the cross section of the rods in their remaining area.

9. Rod belt according to claim 8, wherein:
a) the journals have a circular cross section.

10. Rod belt according to claim 9, wherein:
a) the journals are eccentrically situated with respect to the longitudinal axis of the rods.

* * * * *